US007014837B2

(12) United States Patent
Corbin et al.

(10) Patent No.: US 7,014,837 B2

(45) Date of Patent: Mar. 21, 2006

(54) PROCESS FOR THE PRODUCTION OF NAN-SIZED ZEOLITE A

(75) Inventors: David Richard Corbin, West Chester, PA (US); Albert J. Sacco, Holden, ME (US); Steven L. Suib, Mansfield, CT (US); Qiuhua Zhang, Peru, IL (US)

(73) Assignees: E. I. duPont de Nemours and Company, Wilmington, DE (US); Northeastern University, Boston, MA (US); University of Connecticut, Farmington, CT (US)

( * ) Notice: Subject to any disclaimer, the term of this patent is extended or adjusted under 35 U.S.C. 154(b) by 92 days.

(21) Appl. No.: 10/664,774

(22) Filed: Sep. 16, 2003

(65) Prior Publication Data

US 2005/0058597 A1 Mar. 17, 2005

(51) Int. Cl.
*C01B 39/14* (2006.01)

(52) U.S. Cl. ................ 423/709; 423/716; 423/DIG. 24

(58) Field of Classification Search ................ 423/700, 423/709, 716, DIG. 24; 510/507, 532
See application file for complete search history.

(56) References Cited

U.S. PATENT DOCUMENTS 3,639,099 A 2/1972 Elliott, Jr. et al.
3,755,538 A 8/1973 Albers et al.
3,808,326 A 4/1974 McDaniel et al.
4,160,011 A * 7/1979 Estes et al. ................. 423/701
4,164,551 A 8/1979 Elliott, Jr.
4,173,622 A * 11/1979 Robertson ................... 423/709
4,340,573 A * 7/1982 Vaughan et al. ............ 423/709
4,534,947 A * 8/1985 Vaughan ..................... 423/709
5,863,516 A * 1/1999 Otterstedt et al. .......... 423/700
5,965,105 A * 10/1999 Rayalu et al. .............. 423/712
6,773,693 B1 * 8/2004 Hosokawa et al. ......... 423/702
2001/0053741 A1 * 12/2001 Miccro et al. ................ 502/79
2004/0047803 A1 * 3/2004 Valtchev et al. ............ 423/716

FOREIGN PATENT DOCUMENTS

WO WO9921797 A * 5/1999

OTHER PUBLICATIONS

David E.W. Vaughan, "Secondary Cation Effects on Sodium and Potassium Zeolite Syntheses at Si/Al2=9: Part 1—Phase Development in the Sodium System", Mat. Res. Soc. Symp. Proc. vol. 111 (1988), p. 89-100, Materials Research Society, Annandale, New Jersey.

P. Bodart, et al, "Factors Governing the Synthesis of Zeolites From Silicoaluminate Hydrogels: A Comparative Study of the Crystallization Mechanisms of Zeolites Y. Mordenite and ZSM-5", Journal de chmie physique (1986), p. 777-790, vol. 83, Belguim.

Valentin Valtchev, et al, "Tribochemical activation of seeds for rapid crystallization of zeolite Y", Elsevier Science, Inc. (1995), pp. 193-197, Bulgaria.

Hartmut Kacirek, et al, "Investigations of the Growth of the Zeolite Type NaY", The Journal of Physical Chemistry, (1975), pp. 1589-1593, West Germany.

Zhu, et al., "Synthesis and Characterization of High-Quality Zeolite LTA and FAU Single Nanocrystals", Chem. Mater. (1998), pp. 1483-1486, vol. 10, Japan.

* cited by examiner

*Primary Examiner*—David Sample

(57) ABSTRACT

Described is a process to synthesize nano-size Zeolite A from an amorphous gel precursor which can be synthesized via reaction of $NaAlO_2$, NaOH, and tetraethoxysilane (TEOS). Zeolite A with particle sizes of ~150 nm was made by transformation of the amorphous precursor in $(CH_3)_4NOH$ solution with Zeolite A seeding. The nano-sized Zeolite A can be part of processes for making non-phosphate detergent where the as-synthesized Zeolite A used as builders, for making thin films for separation and/or catalysis, for making secondary ordered patterns.

14 Claims, 1 Drawing Sheet

PROCESS FOR THE PRODUCTION OF NAN-SIZED ZEOLITE A

FIELD OF INVENTION

The invention pertains to a method of producing nano-sized Zeolite A particles from a precursor mixture at room temperatures using small size Zeolite A particles as nucleating seed.

TECHNICAL BACKGROUND

Zeolites are used in many industrial applications, such as nonphosphate detergent builders, as an ingredient in thin films used for separations, as catalysts, and for making secondary ordered patterns. Zeolite crystals are typically less than about 0.5 $\mu$, but have been prepared as small as nanometer size. These nano-sized zeolite crystals exhibit special properties such as less diffusion resistance and extra large external surface, which are important for applications of ultra-fast ion-exchangers, catalyst supports, adsorbents, thin films, and coatings.

Preparation of Zeolite A from hydrothermal treatment of amorphous gel was developed several decades ago (Kerr, G. T. *J. Phys. Chem.,* 1966, 70, 1047) and has been used as a universal method in industry. Crystal sizes of zeolites are affected by many factors such as the temperature (time), alkalinity, ionic strength, silica/alumina sources, seeding, stirring, and aging. Adding seeds and using organic cations usually yield smaller crystals. Low temperature aging and vigorous agitation favor the nucleation process. (Kacirek, H.; et al., *J. Phys. Chem.* 1975, 79, 1589; Valtchev, V. et al. Zeolites 1995, 15, 193; Bodart, P. et al., *J. Chim. Phys.* 1986, 83, 777; Vaughan, D. E. W., *Mat. Res. Soc. Symp. Proc.* 1988, 111, 89; Zhu, G. et al., *Chem. Mater.,* 1998, 10, 1483–1486; U.S. Pat. No. 3,639,099; U.S. Pat. No. 3,755,538; U.S. Pat. No. 3,808,326; U.S. Pat. No. 4,164,551).

Several nano-size zeolites have been synthesized in clear homogeneous solutions, in which TEOS or $SiO_2$ sols are added to sodium aluminate alkali solution. B. J. Schoeman et al., (*Zeolites* 1994, 14, 110) prepared nanosize Zeolite A via this route. S. Mintova et al. (*Science,* 1999, 283, 958) elucidated the mechanism of the nucleation and crystal growth in the synthesis of Zeolite A. Several stages are observed, including formation of gel particles with a diameter of several nanometers, aggregation of these gel particles, nucleation of Zeolite A inside the amorphous gel aggregates, and growth of tiny Zeolite A crystallites at the expense of the embedded amorphous gel. Clear solution syntheses are desirable for mechanistic studies, however, are not economical for practical applications due to the low yields and long crystallization times. G. Zhu et al. (Proc. Int. Zeolite Conf. (12th), 1999, 3, 1863) reported that Zeolite LTA ranging from macro- to nanometer scale was synthesized in the gel systems of $Al_2O_3$—$SiO_2$—$Na_2O$-TEA-$H_2O$ by controlling the synthesis conditions and alkali sources. In this system, large single crystals of up to 80 $\mu$m were obtained.

Schmidt et al. (*Inorg. Chem.* 2000, 39, 2279) described a route to synthesize nanosize zeolites called confined space synthesis, involving the crystallization of the zeolite inside the pore system of an inert mesoporous matrix. The size distribution of zeolite crystals was controlled by selecting the proper matrix. Zeolite A with an average size in the range of 25–37 nm was prepared, using mesoporous carbon black as inert matrix and was isolated by controlled combustion of the carbon matrix.

Applicants have discovered a simple method to nano-sized Zeolite A crystals of less than 200 nm by utilizing a combination of temperatures, organic cations, precursor mixtures, agitation, and seeding. As compared to clear solution synthesis, Applicants' method corresponds to much larger loading on a volumetric basis, which is closer to traditional synthesis methods used in industry, and therefore would be easier to scale up. The phase transformation step from the precursor mixture to crystals is optimized, which consists of decreasing the crystallization temperature to room temperature, using TMAOH instead of NaOH, adding seeds with small particle sizes, and using open systems under vigorous stirring instead of static hydrothermal systems.

SUMMARY OF THE INVENTION

The invention is directed to a process to prepare nano-size Zeolite A comprising the steps of:

a) preparing a precursor mixture comprising sodium, silica, and alumina, wherein the proportions of sodium, silica, and alumina are those required to produce Zeolite A, to form a solid precursor;

b) isolating the solid precursor from step a);

c) combining the solid precursor from step b) with seed crystals of Zeolite A with agitation in an aqueous alkaline solution containing hydroxide ions at a temperature of about 18° C. to about 85° C. to form a mixture containing nano-sized Zeolite A crystals; and d) optionally separating the nano-sized Zeolite A crystals from the mixture of step c).

Preferably the precursor mixture is an amorphous aluminosilicate gel prepared from $NaAlO_2$, NaOH, and tetraethoxysilane at a temperature of about 70° C. to about 100° C.

Preferably the aqueous alkaline solution is an aqueous solution of $(CH_3)_4NOH$ or NaOH at a concentration of about 0.5 to about 3.0 molar. Optionally the aqueous alkaline solution additionally contains one or more of a C1–C6 acetone or alcohol; preferably ethanol.

A preferred method is wherein the precursor mixture is a non-clear solution.

Also preferred is where the seed crystals of Zeolite A are particles of less than 500 nm.

The process mixture formed in step c) is preferably agitated for about 1 day to about 20 days before proceeding to step d); more preferably for more than 10 days.

The process can additionally comprise the steps of:

e) adding the nano-sized Zeolite A crystals with agitation from step d) to an aqueous solution of a Na+ salt to form a mixture containing nano-sized Zeolite A crystals; and f) optionally isolating the nano-sized Zeolite A crystals.

Preferably the mixture formed in step e) is agitated for about 1 day to about 20 days before proceeding to step f).

The invention is also directed to a nano-sized Zeolite A crystal prepared by the process described above, and to non-phosphate detergent builders, thin films, catalysts, and micro-patterns containing the nano-sized Zeolite A herein.

DETAILED DESCRIPTION OF THE INVENTION

Figure 1:
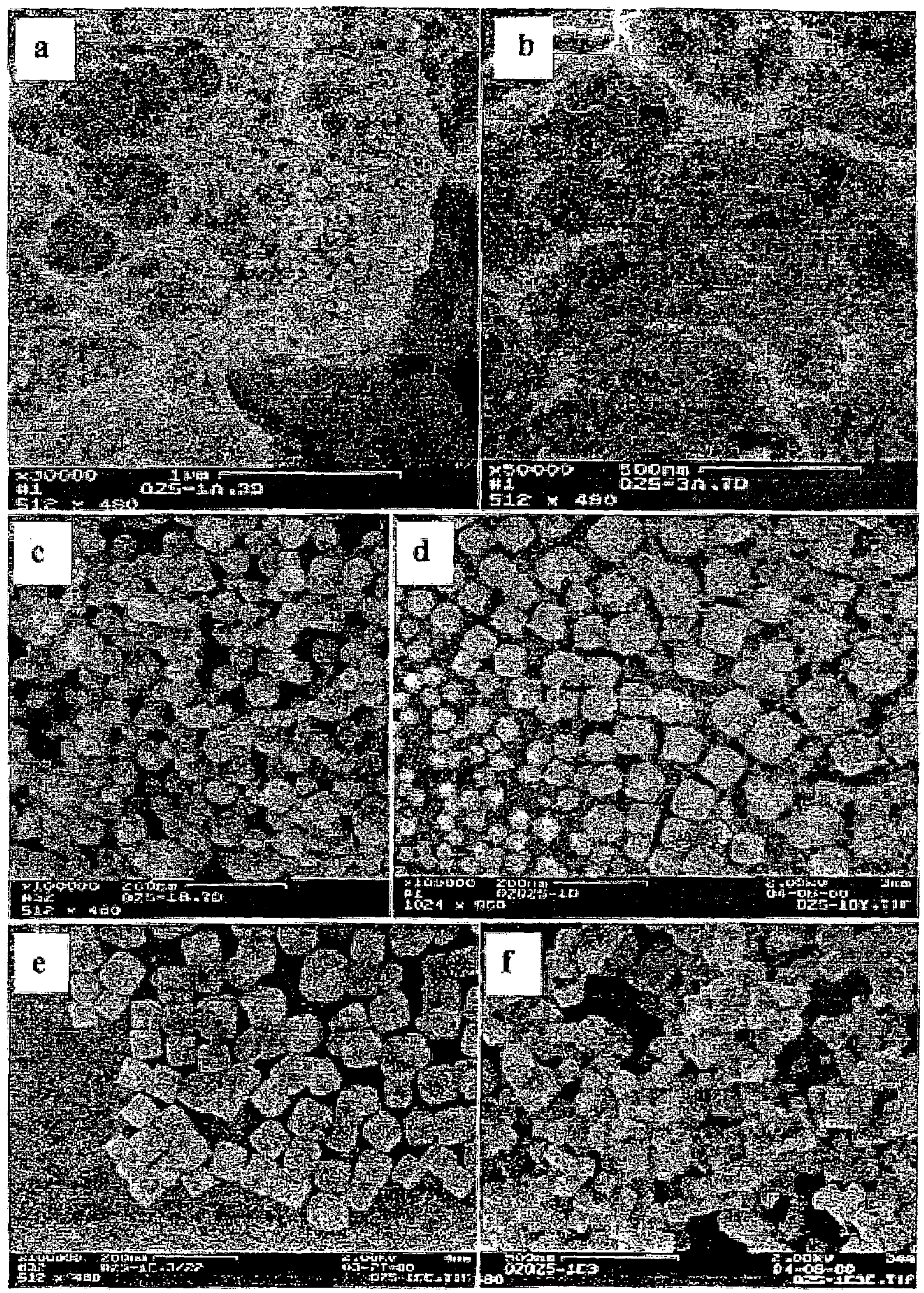
FIG. 1*a* is an SEM photograph of small crystals on the surface of amorphous nano-sized Zeolite A aggregates obtained by aging for 3 days.
FIG. 1*b* is an SEM photograph of the crystals of FIG. 1*a*.
FIG. 1*c* is an SEM photograph of the crystals of FIG. 1*a* after aging for 7 days.
FIG. 1*d* is an SEM photograph of the crystals of FIG. 1*a* after aging for 16 days
FIG. 1*e* is an SEM photograph of the crystals of FIG. 1*a* after aging for 20 days
FIG. 1*f* is an SEM photograph of the crystals of Example 3 obtained in the presence of $Na^+$.

The invention is directed to a process to prepare nano-size Zeolite A comprising the steps of: preparing a precursor mixture comprising sodium, silica, and alumina, wherein the proportions of sodium, silica, and alumina are those required to produce Zeolite A, to form a solid precursor; isolating the solid precursor; combining the isolated solid precursor from with seed crystals of Zeolite A with agitation in an aqueous alkaline solution containing hydroxide ions at a temperature of about 18° C. to about 85° C. to form a mixture containing nano-sized Zeolite A crystals; and optionally separating the nano-sized Zeolite A crystals thus prepared.

Zeolites can be generically described as complex aluminosilicates characterized by three-dimensional framework structures enclosing cavities occupied by ions and water molecules, all of which can move with significant freedom within the zeolite matrix. In commercially useful zeolites, the water molecules can be removed from or replaced within the framework structures without destroying the zeolite's geometry.

Zeolites can be generally represented by the following formula: $M_{2/n}O\emptyset Al_2O_3\emptyset xSiO_2\emptyset yH_2O$; wherein M is a cation of valence n, $x \geqq 2y$ is a number determined by the porosity and the hydration state of the zeolite, generally from 0 to 8. In naturally occurring zeolites, M is principally represented by Na, Ca, K, Mg and Ba in proportions usually reflecting their approximate geochemical abundance. The cations M are loosely bound to the structure and can frequently be completely or partially replaced with other cations by conventional ion exchange.

Zeolite A is crystalline aluminosilicate Linde Type A zeolite and corresponds in its composition to the formula $\{Na_{12}[Al_2SiO_2]\emptyset 27H_2O\}_8$, although other cations may be substituted or exchanged stoichiometrically with the Na. A description of its crystal structure is described in *Atlas of Zeolite Structure Types*, W. M. Meier and D. H. Olson, 2nd Ed., Butterworths, 1987. It is typically prepared from via crystallization from an amorphous sodium aluminosilicate gel containing sodium, alumina, and silica in the proper proportions to produce the required Zeolite A composition. A description of the required proportions for this method, and other methods of preparation are described in *Kirk-Othmer Encycl. of Chem. Technology,* 4th Ed., Vol 16, pg. 888*, Introduction to Zeolite Science and Practice*, Ed. H. Van Bekkum et al., Elsevier, 1991, and U.S. Pat. No. 3,535,075.

By "nano-sized" it is meant having a particle size of less than 100 nanometers.

The seed crystals can be synthesized by any procedure that yields Zeolite A, or obtained commercially. The seed crystals are then produced by using grinding, or any suitable method, to yield the seed crystals where the majority are less than 500 nm. Preferably the seed crystals of Zeolite A are particles of less than 250 nm.

The precursor mixture can be prepared via any method that results in the proper proportions of sodium, silica, and alumina to prepare Zeolite A, as describe above. By "silica" and "alumina" it is meant a compound that yields silica or alumina upon mixing in the precursor, such as but not limited to $NaAlO_2$, tetraethoxysilane, $SiO_2$ gel, sodium silicate, $AlCl_3$, and $Al(OH)_3$. The sodium is typically in the form of NaOH or present with the compound that yields silica or alumina. Preferably the alumina is $NaAlO_2$ and the silica is tetraethoxysilane.

The precursor mixture is preferably a non-clear solution. By "non-clear solution" it is meant a non-free-flowing fluid consisting of a crosslinked network of a material that encapsulates a solvent within an open porous structure. More preferably the precursor mixture is an amorphous aluminosilicate gel. By "amorphous aluminosilicate gel" it is meant a non-free-flowing fluid consisting of a crosslinked network of an aluminosilicate-containing material, which encapsulates a solvent within an open porous structure, and can be considered a suspension in a solvent. The amorphous aluminosilicate gel can be prepared at a temperature of about 18° C. to about 85° C.; more preferably about 70° C. to about 100° C.

The solid precursor formed can be isolated from the precursor mixture by any method known in the art, such as but not limited to centrifugation and filtration. It may also be washed to remove impurities.

The aqueous alkaline solution can be any aqueous solution of pH more than 7. Preferably the aqueous alkaline solution is an aqueous solution of $(CH_3)_4NOH$ or NaOH; more preferably at a concentration of about 0.5 to about 3.0 molar.

The aqueous alkaline solution can also additionally contain one or more of a C1–C6 acetone or alcohol, such as but not limited to ethanol.

The seed crystals and the solid precursor should be added to the mixture containing nano-sized Zeolite A crystals with agitation by any means. The resulting mixture can be aged before the resulting nano-sized crystals are isolated, preferably for about 1 day to about 20 days; more preferably for more than 10 days. Isolation and purification can optionally be performed by any means.

Optionally, the nano-sized Zeolite A crystals formed from the process described above can be additionally added with agitation to an aqueous solution of a Na+ salt to form a mixture containing nano-sized Zeolite A crystals with characteristics different from the original crystals. These crystals can also be optionally isolated and purified, preferably after agitation for about 1 day to about 20 days.

The invention is also directly to a nano-sized Zeolite A crystal prepared by the any of the processes described above, and also to non-phosphate detergent builders, thin films, catalysts, and micro-patterns containing such nano-sized Zeolite A crystals.

EXAMPLES

Example 1

Amorphous material was prepared with a method similar to a literature report. (Kerr, G. T. *J. Phys. Chem.,* 1966, 70, 1047) 10.6 g $NaAlO_2$ was added to 1.1 M NaOH solution in a flask. The mixture solution was heated at 100° C. with stirring. When the $NaAlO_2$ was completely dissolved into the NaOH solution (when the original milky solution turns into clear solution), 10.3 g tetraethoxysilane (TEOS) was added drop-wise to the above boiling solution, and refluxed for 1–1.5 h. Solid products are separated from the mother solution by centrifugation, and washed to pH<9.

Example 2

Synthesis at Room Temperature

Synthesis was done in TMAOH and NaOH solutions in order to study cation effects during crystallization. 1.5 g of the as-prepared amorphous material from Example 1 and 0.08 g seed (thoroughly ground commercial Linde zeolite 4A were dispersed into 20 mL of 1.25 M TMAOH (tetramethylammonium hydroxide) or NaOH solution in a Teflon® beaker, with vigorous stirring. Samples were taken at certain intervals to study the relations of crystal formation and crystal growth processes and processing time.

Example 3

The following experiment is done to study cation effects on the as synthesized Zeolite A crystals. Zeolite A synthesized from TMAOH solution as in Example 2 and aged for 20 days was thoroughly washed to remove adsorbed $TMA^+$ and $OH^-$ ions until the pH was <9. The solid was separated by centrifugation, and transferred to a 20 mL beaker. Then 10 mL of saturated NaCl solution was added to the above solid with stirring at room temperature. Samples were taken at 1 day and 3 days after 10 mL Saturated solution NaCl solution was added.

To study the seeding effects on crystallization, Zeolite A was also synthesized in the systems without adding seeds. Identical conditions were used as described above, except no seeds are used.

Example 4

Synthesis at High Temperature

Without pre-aging: 1.5 g as-prepared amorphous material from Example 1 and 0.08 g seed were dispersed into 5 mL double distilled water (DDW) in a 40 mL glass beaker. The mixed solutions were stirred thoroughly until a milky uniform suspension was obtained. A solution of 1.0 g M NaOH in 15 mL DDW was added to the above mixture, stirring for 1 min. Then the reaction mixture was heated at 80° C. with vigorous stirring. Samples were taken at 2, 5, and 15 min, respectively, for further analysis.

With pre-aging: 1.5 g as-prepared amorphous material from Example 1 and 0.08 g seed were dispersed into 20 mL of 1.25 M NaOH solution. The mixture was stirred at room temperature for 1 day, and then was heated to 80° C. under vigorous stirring. Samples were taken at certain periods of time for SEM analysis. The number of small particle size (<200 nm) increased, while the number of large particle decreased, compared with that with no pre-aging. The particle size of the top limit is similar.

Example 5

Synthesis in Mixed Solvents 1.5 g as-prepared amorphous material from Example 1 and 0.08 g seed were dispersed into a solution of 1.0 g NaOH in 10 mL DDW in a 40 mL glass beaker. 15 mL ethanol (100%) was added to the above aqueous suspension, stirring for 1 min at room temperature. Then the reaction mixture was heated to ~80° C. with vigorous stirring.

Example 6

Characterization

The products from Examples 2–5 were characterized by using X-ray diffraction (XRD, Scintag XDS 2000 diffractometer, Cu K~ radiation with a voltage of 45 mV and a current of 40 mA), Fourier transform infrared spectroscopy (FTIR), and field emission scanning electron microscopy (FESEM, Zeiss DSM 982 Gemini) techniques. In the FESEM experiment, two kinds of backgrounds were used, polished carbon and gold-coated silicon chips. Samples were first dispersed in isopropanol, and then tiny drops of samples were put on the background chips that have been attached to the aluminum sample holders. Samples (on sample holders) were evacuated overnight to remove water and organic solvents before being mounted on the sample chamber of the SEM instrument.

The XRD patterns showed that Zeolite A was the only crystalline product under synthesis conditions described above. SEM results showed that the amorphous substrate prepared in Example 1 consisted of irregular particles with a wide size distribution. The as-prepared dense gel was dispersed in TMAOH solution at room temperature. Small crystals (<30 nm) were observed on the surface of amorphous aggregates obtained by aging for 3 days as described in Example 2, as shown in FIG. 1*a*). The amorphous particles became less dense and the surface was more irregular (FIG. 1*b*), exhibiting wool-woven cluster morphologies. Zeolite A crystals with particle sizes around 50 nm were formed at 7 days on the outer part of the amorphous aggregates (FIG. 1*c*). More crystals were formed after further stirring with the gradual disappearance of the woven wool-like amorphous clusters. Most of the amorphous substrate converted to zeolite A at 11 days, and then grew into fully crystallized zeolite A. FIGS. 1*d* and 1*e* show the SEM photos of the samples obtained at 16 and 20 days, respectively. In FIG. 1*d*, particles in this sample contained well developed zeolite A crystals with a diameter of 60–100 nm, small crystals with a size of 20–50 nm surrounded by amorphous gel, and smaller particles (<20 nm) on the surface of the larger crystals. The smallest particles may be amorphous embedded tiny zeolite crystals or nuclei. At 20 days, a product with 95% of particles having a particle size distribution of 50–150 nm was obtained (FIG. 1*e*). In the system without seed, (Example 3) no zeolite A crystal was detected at 7 days.

The crystals obtained in the presence of $Na^+$ were less separated and some were in the form of agglomerates, as shown in FIG. 1*f*.

What is claimed is:

1. A process to prepare nano-size Zeolite A comprising the steps of:

a. preparing a precursor mixture comprising sodium, silica, and alumina, wherein the proportions of sodium, silica, and alumina are those required to produce Zeolite A, to form a solid precursor;

b. isolating the solid precursor from step a);

c. combining the solid precursor from step b) with seed crystals of Zeolite A having particle sizes of less than 500 nm, with agitation in an aqueous alkaline solution containing hydroxide ions at a temperature of about 18° C. to about 85° C. to form a mixture containing nano-sized Zeolite A crystals; and d. optionally separating the nano-sized Zeolite A crystals from the mixture of step c).

2. The process as of claim 1 wherein the precursor mixture is a non-clear solution.

3. The process as of claim 2 wherein the precursor mixture is an amorphous aluminosilicate gel.

4. The process as of claim 3 wherein the precursor mixture is an amorphous aluminosilicate gel prepared from $NaAlO_2$, NaOH, and tetraethoxysilane.

5. The process as of claim 3 wherein the amorphous aluminosilicate gel is prepared at a temperature of about 70° C. to about 100° C.

6. The process as of claim 1 wherein the aqueous alkaline solution is an aqueous solution of $(CH_3)_4NOH$ or NaOH.

7. The process as of claim 6 wherein the aqueous solution of $(CH_3)_4NOH$ or NaOH is at a concentration of about 0.5 to about 3.0 molar.

8. The process as of claim 1 wherein the seed crystals of Zeolite A are particles of less than 250 nm.

9. The process as of claim 1 wherein the mixture formed in step c) is agitated for about 1 day to about 20 days before proceeding to step d).

10. The process as of claim 9 wherein the solution formed in step c) is agitated for more than 10 days.

11. The process as of claim 1 wherein the aqueous alkaline solution additionally contains one or more of a $C_1$–$C_6$ acetone or alcohol.

12. The process as of claim 11 wherein aqueous alkaline solution additionally contains ethanol.

13. A process to prepare nano-size Zeolite A comprising the steps of:

a. preparing a precursor mixture comprising sodium, silica, and alumina, wherein the proportions of sodium, silica, and alumina are those required to produce Zeolite A, to form a solid precursor;

b. isolating the solid precursor from step a);

c. combining the solid precursor from step b) with seed crystals of Zeolite A with agitation in an aqueous alkaline solution containing hydroxide ions at a temperature of about 18° C. to about 85° C. to form a mixture containing nano-sized Zeolite A crystals;

d. optionally separating the nano-sized Zeolite A crystals from the mixture of step c);

e. adding the nano-sized Zeolite A crystals with agitation from step d) to an aqueous solution of a Na+ salt to form a mixture containing nano-sized Zeolite A crystals; and f. optionally isolating the nano-sized Zeolite A crystals.

14. The process as in claim 13 wherein the mixture formed in step e) is agitated for about 1 day to about 20 days before proceeding to step f).

* * * * *